(12) United States Patent
Moeller et al.

(10) Patent No.: US 12,038,831 B2
(45) Date of Patent: *Jul. 16, 2024

(54) TESTING OF A RESOURCE MANAGER OF AN APPLICATION MANAGEMENT SYSTEM

(71) Applicant: Microsoft Technology Licensing, LLC, Redmond, WA (US)

(72) Inventors: Justin G. Moeller, Eden Prairie, MN (US); Willis Lang, Edina, MN (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,200

(22) Filed: Aug. 7, 2023

(65) Prior Publication Data
US 2023/0385187 A1    Nov. 30, 2023

Related U.S. Application Data

(63) Continuation of application No. 16/910,956, filed on Jun. 24, 2020, now Pat. No. 11,768,760.

(51) Int. Cl.
| | |
|---|---|
| *G06F 9/46* | (2006.01) |
| *G06F 9/50* | (2006.01) |
| *G06F 9/54* | (2006.01) |
| *G06F 11/36* | (2006.01) |

(52) U.S. Cl.
CPC ........ *G06F 11/3688* (2013.01); *G06F 9/5083* (2013.01); *G06F 9/542* (2013.01)

(58) Field of Classification Search
None
See application file for complete search history.

(56) References Cited

U.S. PATENT DOCUMENTS 9,811,445 B2 *  11/2017  Moretto .................. G06F 11/34

* cited by examiner

*Primary Examiner* — Bing Zhao
(74) *Attorney, Agent, or Firm* — Weaver IP L.L.C.

(57) ABSTRACT

Testing methods and systems are provided for testing a resource manager of an application management system. The testing systems include a load orchestrator configured to obtain an artificial metric that is determined based on a utilization model (e.g., CPU usage, memory allocation, or disk usage, number of webserver sessions). The load orchestrator transmits the artificial metric to applications in a cluster of computing nodes. The applications transmit the artificial metric to the resource manager. In response, the resource manager generates control output for managing applications in the cluster based on the artificial metric (e.g., scaling, load balancing, application placement, failover of applications, or defragmenting data). The utilization model may include executable code for generating artificial metric values. The model may be received as a result of an API call. The load orchestrator may be instantiated in an orchestration framework or in each node of the cluster.

20 Claims, 7 Drawing Sheets

TESTING OF A RESOURCE MANAGER OF AN APPLICATION MANAGEMENT SYSTEM

CROSS-REFERENCE TO RELATED APPLICATIONS

This application is a continuation of, and claims priority to, pending U.S. patent application Ser. No. 16/910,956, filed Jun. 24, 2020, titled "TESTING OF A RESOURCE MANAGER OF AN APPLICATION MANAGEMENT SYSTEM," the entirety of which is incorporated by reference herein.

BACKGROUND

Managed cloud database systems operate cloud scale database services that run on machines and clusters in globally distributed datacenters. To manage databases inside a cluster, cloud database services (e.g., Microsoft® Azure SQL Database) may employ an orchestration framework (e.g., Service Fabric, Kubernetes, etc.). The orchestration framework performs placement, failover, defragmentation, and other types of operations on databases in clusters. Additionally, the orchestration framework may automatically load balance databases across a set of machines (e.g., nodes) in a cluster. To achieve uniform load balancing, each database (or more generally, each application, pod, or resource) may report its "load" to the orchestration framework for a given set of metrics. Many types of metrics may be defined, but often, central processing unit (CPU) utilization, memory allocation, and disk usage are reported. Each machine in a cluster has an associated capacity for each metric. The orchestration framework will place applications on machines in which the reported application metric load does not violate the machine's metric capacities. In this manner, each application may receive its requested resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Testing methods and systems are provided for testing a resource manager of an application management system. The testing systems comprise one or more processors and one or more memory devices that store program code to be executed by the one or more processors. The program code includes an orchestration framework. The orchestration framework includes a load orchestrator. The load orchestrator is configured to obtain an artificial metric value determined based on a utilization model, and transmit the artificial metric value to one or more applications instantiated in a cluster of computing nodes. The resource manager is configured to receive the artificial metric value from the one or more applications, and generate control output for managing applications in the cluster of computing nodes based on the received artificial metric value.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
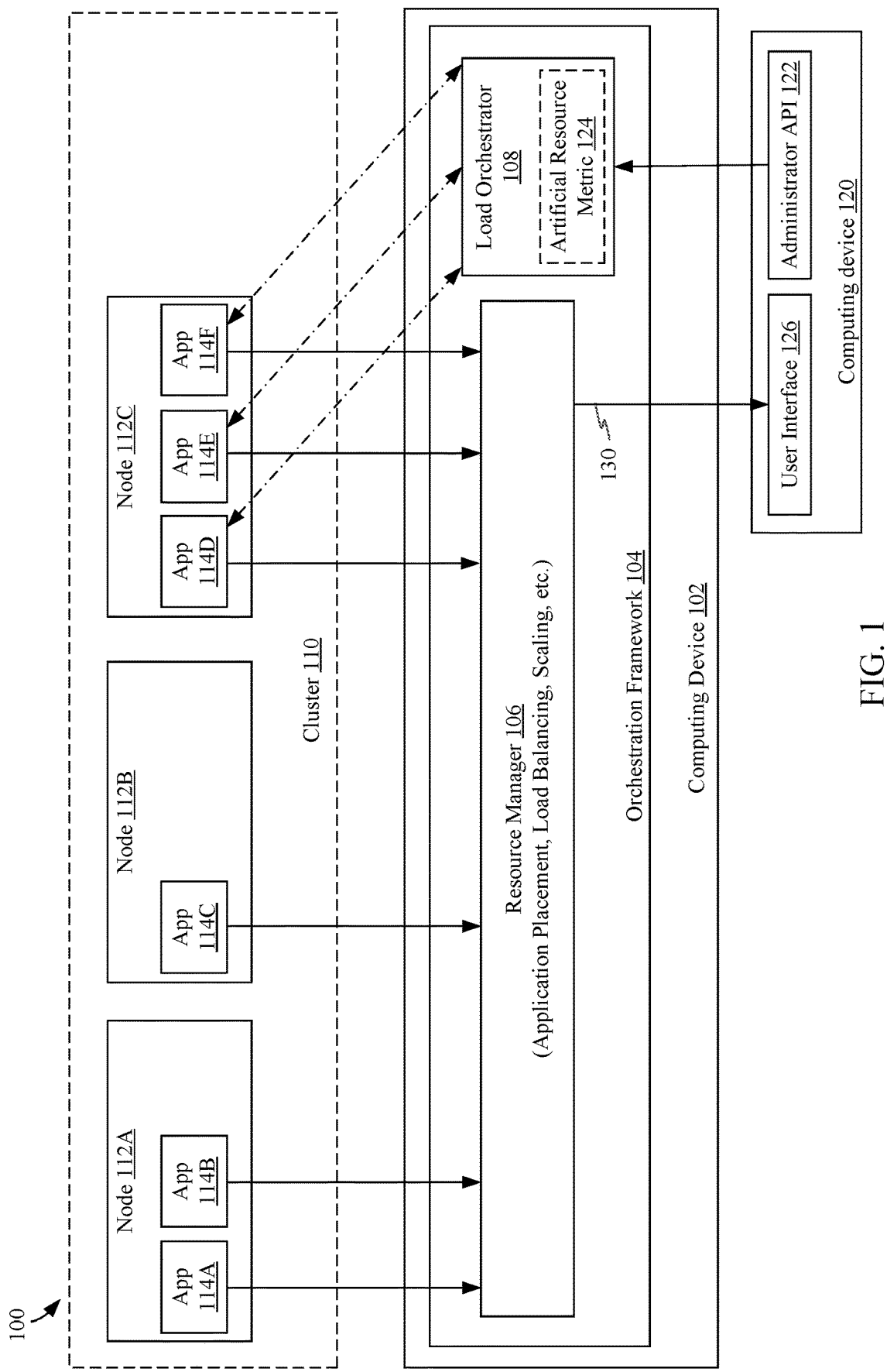
FIG. 1 is a block diagram of a system that includes a load orchestrator configured for testing resource management behavior of an orchestration framework, where the load orchestrator is instantiated in the orchestration framework, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Cloud database services may employ an orchestration framework to manage applications inside a cluster or multiple clusters. As used herein, the term "cluster" refers to a plurality of commonly-managed physical and/or virtual machines, and each machine in a cluster may be referred to as a "node." An orchestration framework includes a system for automating deployment and management of applications as a resource. The applications are instantiated inside nodes of a cluster. The applications may include, for example, databases, websites, video streaming engines, or other applications. The orchestration framework may perform application placement, load balancing, scaling, failover, defragmentation, and other types of operations on applications in a cluster of nodes. In some embodiments, an application may include a collection of services or containers that work together, and the application may be the unit of placement inside a cluster. The orchestration framework may automatically load balance applications (i.e., resources) across a set of nodes in the cluster. To achieve uniform load balancing, each application may report its "load" to the orchestration framework in a set of metrics. For example, CPU utilization, memory allocation, disk usage, or other metrics may be reported by the applications. Each node in a cluster has an associated capacity for each metric. In order to distribute applications across nodes, the orchestration framework may place applications on nodes where an application's reported metric load does not violate the node's metric capacities.

To improve efficiency of cluster operations and minimize cost of goods sold (COGS), a managed database system may operate clusters at high utilization. For example, configuration and algorithmic changes may be made to the placement and load balancing strategies of an orchestration framework to operate clusters at high utilization. Increasing the cluster utilization may be good for COGS, but is potentially dangerous for system performance, and it may be customer impacting when there are unexpected usage spikes.

A resource management component of an orchestration framework (e.g., of an application management system) may perform the application placement and load balancing operations within the nodes of a cluster, or multiple clusters. Issues that arise while running highly-utilized clusters in a production environment often occur while operating clusters at scale (e.g., when additional resources are unavailable). However, applications instantiated in a stage or test cluster are often under-utilized. As such, it may be difficult to test effects of algorithmic or configuration changes made to the resource manager component, because the lack of activity is unrepresentative of a busy production environment. In a production environment, when applications are unevenly distributed among nodes in a cluster, one or more of the applications may be moved to a different node to balance the applications among the nodes. However, in a stage environment, it may be prohibitively expensive to drive enough of a workload to all applications in a cluster, at scale, in order to trigger the load balancing process. Therefore some of the applications in a node may remain idle, not having clients to drive a workload. It is difficult to test changes made to the resource manager, or cluster-wide changes at scale, when the applications are reporting little or no load. For this reason, these algorithmic or configuration changes are often tested in production clusters by cautiously rolling out the changes to a subset of clusters.

There are stand-alone simulators that can simulate the behavior of placement and load balancing processes, but due to the complex architecture of managed database systems (e.g., Microsoft® Azure® SQL Database), these stand-alone simulators are also likely to be inaccurate with respect to a production cluster. For example, orchestration frameworks produce results involving actual databases being moved around and database systems booting up and shutting down. Each of these results has probability of error, and each takes time to complete. These types of results are not usually considered or represented in standalone orchestration framework simulators. There are tensile points of breakage within a real cluster with real databases that are not exposable with a standalone simulator.

Testing changes made in a "stage cluster" that is filled with databases may provide a more realistic outcome, however, as noted above, this case suffers from the problem that most databases in a stage cluster are not doing anything (they have no actual load). For testing purposes, clients issue queries to a database to generate the load. For example, in order to test changes made to a load balancer at scale, testers use a proportional number of clients relative to the number of databases in the cluster, which is financially very expensive. Additionally, the workload that clients generate in stage clusters is likely not representative of what customers run in a production environment.

To address one or more of the foregoing issues, methods and systems are described herein in which a load orchestrator facilitates the reporting of artificial metrics to an orchestration framework by applications within cluster nodes. In some embodiments, the load orchestrator may be a component of an orchestration framework. In this example, the orchestration framework is not limited to any specific orchestration framework, and any suitable orchestration framework may be utilized. In one example, the load orchestrator may be a component of the orchestration framework Service Fabric that may be utilized in Microsoft® Azure® SQL Database. In other embodiments, the load orchestrator may be a component of a node (e.g., a computing device or virtual machine) of a cluster, where each node of the cluster includes one or more applications. In other words, each node in a cluster may have its own load orchestrator that manages the reporting of artificial metrics to the orchestration framework by applications within node.

As described above, applications instantiated within a node of a cluster routinely report metrics such as CPU utilization, memory allocation, disk utilization, etc. to a resource manager component of an orchestration framework, and in response, the resource manager makes adjustments to the system (e.g., load balancing, placing applications, scaling, etc.) to handle the load more efficiently, faster, or for other performance benefits. When testing or observing the behavior of the resource manager for improved performance, the load orchestrator may manage the reporting of artificial metrics by the applications to the resource manager. The load orchestrator may inform the applications of what value they should report for a given artificial metric. In other words, the load orchestrator includes logic for changing the behavior of the applications (or subset of the applications) in the cluster. For example, in response to a command from the load orchestrator, databases (or other applications) of a specific service level objective (SLO) may report an artificial CPU usage according to a normal distribution of a specified mean and variance to the resource manager component of the orchestration framework. The databases will report the artificial CPU usage metric according to the normal distribution, even if there is no actual load on the database. For example, an idle database may report that it is using two cores at 100% utilization when, in reality, there is no activity is taking place. From the orchestration framework's point of view, the database is using the full two cores. In response to the artificial metric, the orchestration framework will act to move a database or failover a database if a node's capacity becomes violated. In one non-limiting example, the resource manager of the orchestration framework may be the Service Fabric framework, and the database may be an application in Microsoft® Azure® SQL Database.

In some embodiments, values of the artificial metrics may be based on a utilization model, for example, a statistical model. In some embodiments, the utilization model may comprise values distributed over time or it may be stateless (e.g., probabilities of the occurrence of an event). The particular utilization model chosen to be used for testing the orchestration framework may be determined based on a type of cluster workload pattern. In one example, depending on the utilization model, a test may reveal how the orchestration framework functions under a sporadic bursty application workload. In this example, a statistical distribution may be chosen to approximate this sporadic, bursty behavior (e.g., as in a Poisson distribution) for generating the artificial metric values. Test results based on the applied bursty artificial workload metrics may be compared to more predictable workloads, by using a more predictable distribution (e.g., a normal distribution) to generate the artificial metric values. In this manner, the system (e.g., the orchestration framework) may be pushed and tested in ways that weren't possible before.

In accordance with such embodiments, the proportional number of clients that are currently used to generate load to the applications in a stage cluster test are no longer needed. Furthermore, there is no longer a need to decide on a representative production workload to apply in a test. The load orchestrator can use utilization models that are sourced from actual production data to more accurately represent what kind of load the applications report in production clusters. Using utilization models sourced from production data allows scaling of the reporting of artificial metrics for testing purposes to thousands of applications at once. Cluster-wide problematic scenarios that are currently difficult to reproduce for testing purposes, can now be efficiently replicated using the load orchestrator. For example, one example problematic scenario includes what happens when application usage spikes in a coordinated fashion throughout the cluster.

Using utilization models for generating artificial metric loads allows for a reduction in the dimensionality of the problem of generating a workload. For example, the dimensionality may be reduced based on the number of different physical and logical artificial metrics that are defined for the application and load orchestrator. If only CPU, memory, and disk metrics are to be tracked, there are fewer utilization models needed to capture the different workload patterns for all of the databases relative to the different permutations of structured query language (SQL) workloads or queries to be considered for generating a representative metric load.

As described herein, the load orchestrator may dynamically report artificial metrics according to a utilization model. The utilization model may be a statistical distribution model and/or may be sourced from production data (e.g., actual data or metrics reported by applications running in a production environment). As such, the number of clients needed to generate a workload for testing orchestration framework behavior no longer needs to be proportional to the number of applications in the cluster. Moreover, a representative workload is not needed to execute against the applications. Just a few utilization models may be used, rather than many different actual workloads, to represent a population of applications functioning in a cloud cluster. The load orchestrator allows for the ability to realistically re-create and stage complex problematic cluster-wide scenarios, such as correlated spikes in resource usage. Furthermore, the load orchestrator allows for the ability test the orchestration framework in ways that are not currently possible (e.g., testing how a new placement algorithm compares to an old one when running thousands of applications). Moreover, the load orchestrator allows for the ability to create and test cluster-wide scenarios that have not been available for production environment testing before.

Embodiments for testing the behavior of an orchestration framework may be implemented in various ways. For instance, FIG. 1 is a block diagram of a system 100 that includes a load orchestrator configured for testing resource management behavior of an orchestration framework, where the load orchestrator is instantiated in the orchestration frame work, according to an example embodiment.

As shown in FIG. 1, a system 100 includes a computing device 102, a cluster 110, and a computing device 120. Computing device 102 includes an orchestration framework 104, a resource manager 106, and a load orchestrator 108. Cluster 110 includes nodes 112A-112C. Node 112A includes applications 114A-114B, node 112B includes application 114C, and node 112C includes applications 114A-114C. Computing device 120 includes an administrator application programming interface (API) 122 and a user interface 126. Also shown in system 100 is an artificial metric 124 and control output 130.

Computing device 102 is communicatively coupled to nodes 112A-112C and computing device 120. Nodes 112A-112C may each be a separate computing device, or may be virtual machines instantiated in a computing device. Computing device 102, nodes 112A-112C, and computing device 120 may each comprise any suitable computing device, such as a stationary computing device (e.g., a desktop computer or personal computer), a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), a gaming console/system (e.g., Microsoft Xbox®, Sony PlayStation®, Nintendo Wii® or Switch®, etc.), an appliance, a set top box, etc.

As described above, cluster 110 includes nodes 112A-112C. In some embodiments, the nodes of cluster 110 may be configured to act as a single system. Various types of systems may be represented by cluster 110. For example, cluster 110 may be an SQL database system, a website, a real time stream processing engine, a web-based document management system, a storage system, or other types of applications. In some embodiments, applications 114A-114F are configured to communicate with each other and collaborate to perform a set operations. In some embodiments, applications 114A-114F are a collection of services or containers that work together. Each service or container may include code and its dependencies in an independent and self-contained unit.

Orchestration framework 104 is configured to dynamically deploy and manage applications in cluster 110. For example, resource manager 106 may be a component of orchestration framework 104, which is configured to instantiate applications, such as applications 114A-114F, inside nodes 112A-112C. Resource manager 106 is also configured to automatically manage workloads executed in cluster 110 by placing applications in nodes 112A-112C, performing load balancing across nodes 112A-112C, scaling node capacity up or down based on load, performing failover to one or more applications when an instantiated application becomes unavailable, defragmenting data (e.g., reorganizing indexes according to the physical order of data), and/or performing other types of operations in cluster 110. An application, such as one of applications 114A-114F, may be considered the unit of placement inside cluster 110.

Each of applications 114A-114F may be configured to report various "load" metrics to resource manager 106. For example, the load metrics may include CPU utilization, memory allocation, disk usage, and/or any other suitable metric. Each node in cluster 110 has an associated capacity for each reported metric. In order to distribute applications 114A-114F evenly across nodes 112A-112C, resource manager 106 places applications on nodes where the application's reported metric loads do not violate the node's metric capacities. Although FIGS. 1 and 3 include three nodes (112A-112C), with six applications (114A-114F), cluster 110 may include more or fewer nodes and more or fewer applications. Moreover, the number of applications active in cluster 110, or in any of the nodes, may vary dynamically over time, for example, based on the demand for greater or fewer resources. Moreover, although only one cluster 110 is shown in FIG. 1, orchestration framework 104 and/or resource manager 106 may manage additional clusters.

Orchestration framework 104 is instantiated in computing device 102 and may be configured automatically perform server configuration and management operations with respect to one or more clusters such as cluster 110 and nodes 112A-112C. Orchestration framework 104 is not limited to any specific type of orchestration framework, and may be any suitable orchestration framework. In some embodiments, (as shown in FIG. 1) orchestration framework 104 is configurable to execute functionality performed by resource manager 106 and load orchestrator 108.

Referring to FIG. 1, load orchestrator 108 may be a component of orchestration framework 104. Load orchestrator 108 is configured to control a process for testing the behavior of resource manager 106 as it manages various artificial workloads reported by applications in nodes 112A-112C of cluster 110. More specifically, load orchestrator 108 is configured to orchestrate reporting of artificial metrics 124 by applications 114A-114F, to resource manager 106, for testing purposes. The values of artificial metric 124 may be based on a utilization model. In some embodiments, the utilization model may comprise values distributed over time or it may be stateless (e.g., probabilities of the occurrence of an event). In some embodiments, the utilization model may represent an actual workload measured and/or reported by applications in a live production cluster. In general, artificial metric 124 may be defined as any arbitrary real or meta metric (e.g., a physical metric, a logical metric, etc.). For example, artificial metric 124 may comprise a value describing a state, a behavior, or input that is relevant to an application (e.g., a database, web site, etc.). In some embodiments, artificial metric 124 may be a resource metric. One or more of applications 114A-114F may then report artificial metric 124 values to resource manager 106 for testing purposes.

Load orchestrator 108 may be communicatively coupled to applications 114A-114F and/or administrator API 122. In some embodiments, load orchestrator 108 may be configured to obtain artificial metric 124 values from computing device 120, as a result of a user initiated call to administrator API 122. Artificial metric 124 values may represent values of a workload metric (e.g., CPU usage, memory allocation, disk usage, number of sessions of logged in users for a webserver, etc.), which may be used by resource manager 106 to manage workload in cluster 110. Alternatively or in addition, load orchestrator 108 may be configured receive executable logic, code, and/or parameters of a utilization model from computing device 120 as a result of the administrator API 122 call. Load orchestrator 108 may also be configured to execute the logic, code, and/or parameters to generate samples of the utilization model, which may be used to determine the one or more artificial metric 124 values. In one example, the utilization model may describe a model of CPU usage over time, such as a normal distribution. The received parameters may include mean and variance values. Moreover, the received parameters may indicate points in time to sample the distribution to obtain the values of artificial metric 124. Load orchestrator 108 may be configured to store the received executable logic, code, and/or parameters of a utilization model, and/or the received one or more artificial metric 124 values, in a persistent storage (not shown) such that they may be utilized even after a rebooting of computing device 102.

In some embodiments, load orchestrator 108 is configured to receive a request for an artificial metric 124 value (e.g., an artificial number of sessions of a webserver metric, an artificial CPU usage metric, an artificial memory allocation metric, an artificial disk usage metric, etc.) from one or more of applications 114A-114F, one or more nodes 112A-112C, and/or one or more clusters such as cluster 110. In response, load orchestrator 108 is configured to transmit artificial metric 124 values to one or more of applications 114A-114F, based on the request.

Resource manager 106 is configured to receive one or more artificial metric 124 values (e.g., from the one or more applications 114A-114F) and respond as if artificial metric 124 values were metrics reported based on an actual workload occurring in applications 114A-114F. For example, in response to the receiving the artificial metric 124 values, resource manager 106 is configured to generate control output 130 that indicates one or more resource manager 106 operations such as application placement, load balancing, scaling, failover, defragmentation, or other types of cluster operations. In general resource manager 106 may execute algorithms and may be configured so as to perform these operations according to various strategies. The algorithms and configuration parameters may be tuned or replaced to improve resource management functionality, and in turn improve performance of applications and nodes running in the system (e.g., higher utilization, speed, reliability, etc.). Such performance improvements often lead to cost savings. For example, the number of resources needed to complete a task may be reduced by improving resource management functionality and thereby improve resource usage efficiency. In other words, application operation performance (e.g., database queries, website access, streaming, etc. performance) may be improved by improving the functionality of resource manager 106.

The functionality of resource manager 106 may be tested utilizing output 130 of load orchestrator 108. In some embodiments, control output 130 may be transmitted to computing device 120, for example, to be stored, analyzed, and/or displayed via user interface 126. In this manner, actions that would be generated by resource manager 106 in response to a workload similar to the load defined by the reported values of artificial metric 124 may be tested and observed. Load orchestrator 108 allows for the ability to realistically re-create and stage complex problematic cluster-wide scenarios, such as correlated spikes in resource usage, and allows for the ability test the functionality of resource manager 106 in such scenarios. For example, control output 130 may indicate how resource manager 106 would function utilizing a new placement algorithm in comparison to an old placement algorithm when running thousands of applications. In this manner, developers may load test resource manager 106 to understand the behavior of the system under a specified expected load. Alternatively, or in addition, resource manager 106 may be configured perform the operations indicated in control output 130 (for testing purposes) such as performing application placement, load balancing, scaling, failover, defragmentation, or other types of operations in nodes 112A-112C of cluster 110.

Figure 5:
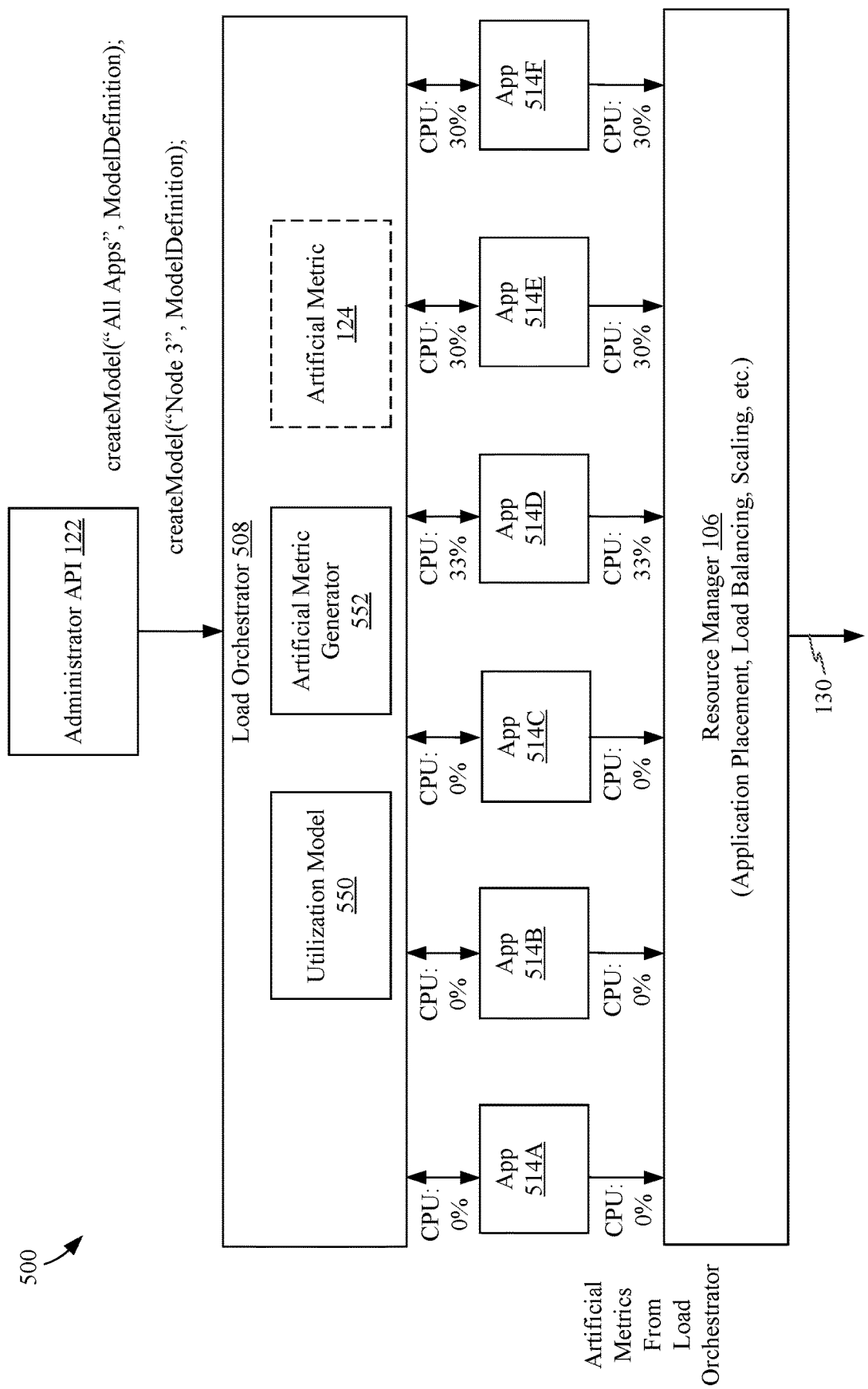
FIG. 5 is a is a block diagram of a system for generating an artificial metric, according to an example embodiment.

Administrator API 122 of computing device 120 is configured to transmit information to load orchestrator 108 so that it may obtain artificial metric 124 (as described in more detail with respect to FIG. 5). For example, the information may include one or more artificial metric 124 values. Alternatively or in addition, the information may include logic, code, and/or parameters for generating values of a utilization model and determining one or more artificial metric 124 values based on the model. Administrator API 124 may be called in response to input received via a user interface 126 of computing device 120. For example, user interface 126 may be configured to receive user input to select an artificial workload pattern or utilization model (e.g., a statistical model or one or more values of an artificial metric 124). User input may also indicate a sampling rate or time for transmitting samples of a utilization model or metric 124 values to resource manager 106. User interface 126 may also be configured to receive user input for configuring other aspects of a resource manager 106 test, for example, to indicate which resources (e.g., applications 114A-114F), nodes (e.g., nodes 112A-112F), and/or clusters (e.g., cluster 110 and/or other clusters), are to receive artificial metrics 124. In some embodiments, user interface 126 is configured to receive control output 130 from resource manager 106 or orchestration framework 104 and format control output 130 for display and/or analysis via user interface 126.

In embodiments, system 100 may operate in various ways to perform its functions. For example, FIG. 2 is a flowchart 200 of a method for testing resource management behavior of an orchestration framework by a load orchestrator that is a component of the orchestration framework, according to an example embodiment.

In one embodiment, flowchart 200 may be performed by load orchestrator 108 of orchestration framework 106 in computing device 102. For the purpose of illustration, flowchart 200 of FIG. 2 is described with reference to FIG. 1.

Figure 2:
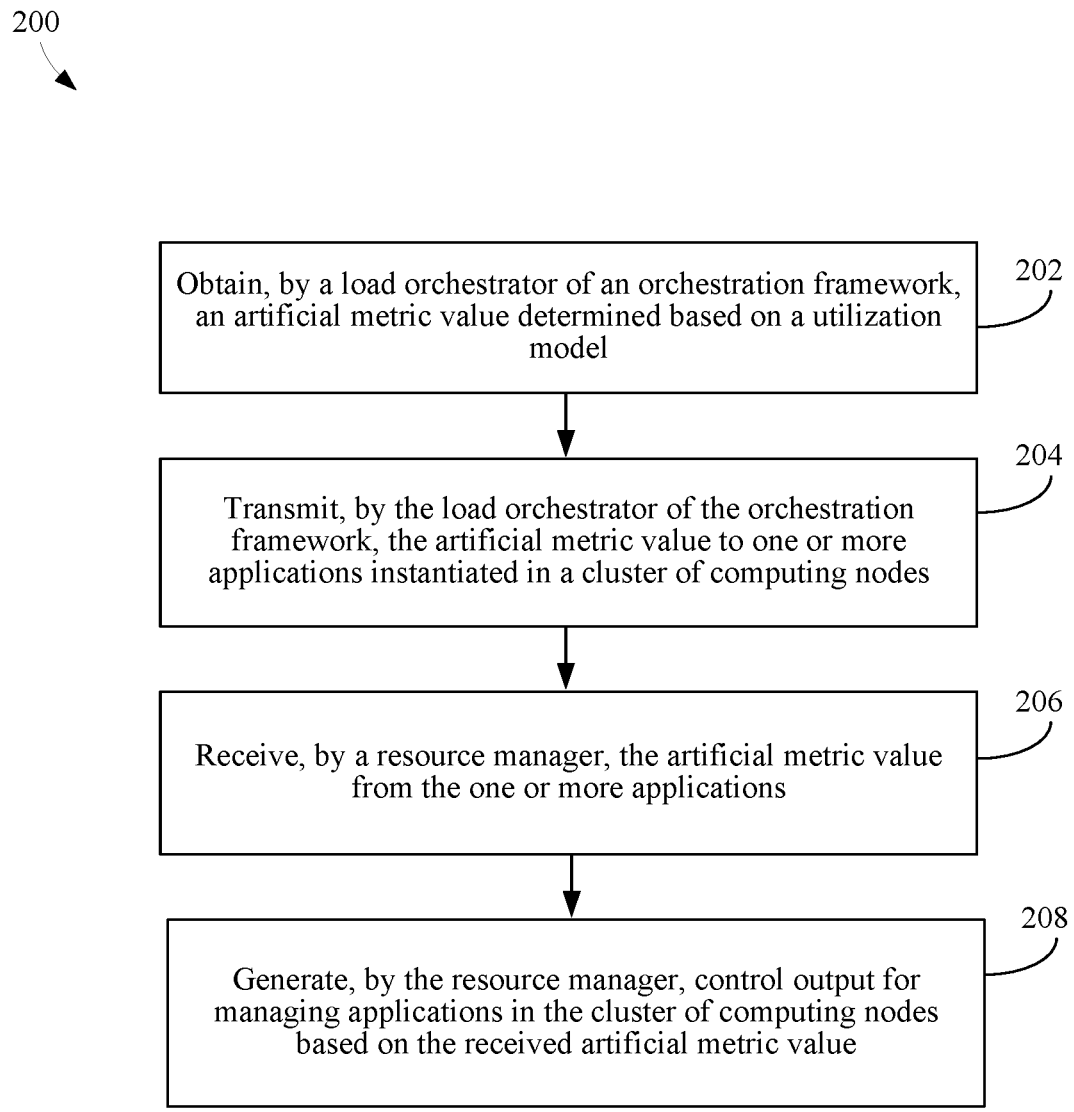
FIG. 2 is a flowchart of a method for testing resource management behavior of an orchestration framework by a load orchestrator that is a component of the orchestration framework, according to an example embodiment.

Flowchart 200 of FIG. 2 begins with step 202. In step 202, a load orchestrator of an orchestration framework obtains an artificial metric value determined based on a utilization model. For example, load orchestrator 108 of orchestration framework 104 may obtain artificial metric 124 information, which is determined based on a utilization model. In some embodiments, the utilization model may comprise values distributed over time or it may be stateless (e.g., probabilities of the occurrence of an event). As described above, artificial metric 124 may represent any suitable metric such as a physical metric, a logical metric, etc. For example, artificial metric 124 may represent a workload metric (e.g., CPU usage, memory allocation, disk usage, number of webserver sessions, etc.) for use by resource manager 106 to manage workload in cluster 110. Load orchestrator 108 may receive the artificial metric 124 information as a result of a user initiated call to API 122 of computing device 120. In one example, the artificial metric 124 information may include one or more artificial metric 124 values. Alternatively or in addition, the artificial metric 124 information may include logic, code, and/or parameters for generating values of a utilization model that may be used to determine one or more artificial metric 124 values. For example, the received artificial metric 124 information may describe a model of CPU usage over time, such as a normal distribution. The received artificial metric 124 information may include parameters such as mean and variance and may indicate points in time to sample the distribution. Load orchestrator 108 may execute the code to sample the CPU usage model to generate one or more artificial metric 124 values. Load orchestrator 108 may store the received artificial metric 124 information and/or one or more artificial metric 124 values in persistent storage (not shown) such that they may be utilized even after a reboot of computing device 102 for future testing operations.

In step 204, the load orchestrator of the orchestration framework transmits the artificial metric value to one or more applications instantiated in a cluster of computing nodes. For example, load orchestrator 108 may transmit one or more artificial metric 124 values to one or more of applications 114A-114F in nodes 112A-112C of cluster 110. Referring to FIG. 1, load orchestrator 108 is shown transmitting artificial metrics 124 to applications 114D-114F. User input received via user interface 124 may specify sending artificial metric 124 values to particular applications 114A-114F, particular nodes 112A-112C, and/or one or more particular clusters, such as cluster 110. In one example embodiment, one or more of applications 114A-114F, or one or more nodes 112A-112C, may transmit a request signal to load orchestrator 108 to request an artificial metric 124 (e.g., an artificial CPU usage metric, an artificial memory allocation metric, an artificial disk usage metric, an artificial number of webserver sessions metric, an artificial number of video streaming sessions, etc.). In response, load orchestrator 108 may transmit artificial metric 124 values to one or more of applications 114A-114F, based on the request. For example, in embodiments where the utilization model is an executable model indicating a distribution of values over time, load orchestrator 108 may execute the utilization model, in response to the request, and thus, generate artificial metric 124 values. The generated artificial metric 124 values may then be transmitted to one or more of applications 114A-114F (e.g., for their reporting of artificial metric 124 values to resource manager 106).

In step 206, the resource manager may receive the artificial metric value from the one or more applications. For example, resource manager 106 may receive artificial metric 124 values from one or more of applications 114A-114F. In some embodiments, artificial metric 124 values may be received by resource managers 106 via the same communication channels used by applications 114A-114F for reporting actual metrics that reflect an actual workload of the applications.

In step 208, the resource manager may generate control output for managing applications in the cluster of computing nodes based on the received artificial metric value. For example, resource manager 106 may generate control output 130 for managing applications in cluster 110 of computing nodes 112A-112C based on the received artificial metric 124 values. Control output 130 of resource manager 106 may indicate operations of resource manager 106 with respect to applications in cluster 110 that would be performed under conditions represented by the resource usage model. For example, control output 130 may indicate one or more of scaling, load balancing, application placement, failover of applications, defragmenting data, etc.

Embodiments of systems for testing operations performed by resource manager 106 may be implemented in various ways. For instance, FIG. 3 is a block diagram of a system 300 that includes a plurality of load orchestrators that are configured for testing resource management behavior of an orchestration framework, where each of the load orchestrators is instantiated in a node of a cluster of nodes, according to an example embodiment.

System 300 includes computing device 102, cluster 110, and computing device 120. Computing device 102 includes orchestration framework 104 and resource manager 106. Cluster 110 includes nodes 112A-112C. Node 112A includes applications 114A-114B and load orchestrator 108A, node 112B includes application 114C and load orchestrator 108B, and node 112C includes applications 114A-114C and load orchestrator 108C. Computing device 120 includes administrator API 122 and user interface 126. Also shown in system 300 is artificial metric 124 and control output 130.

Figure 3:
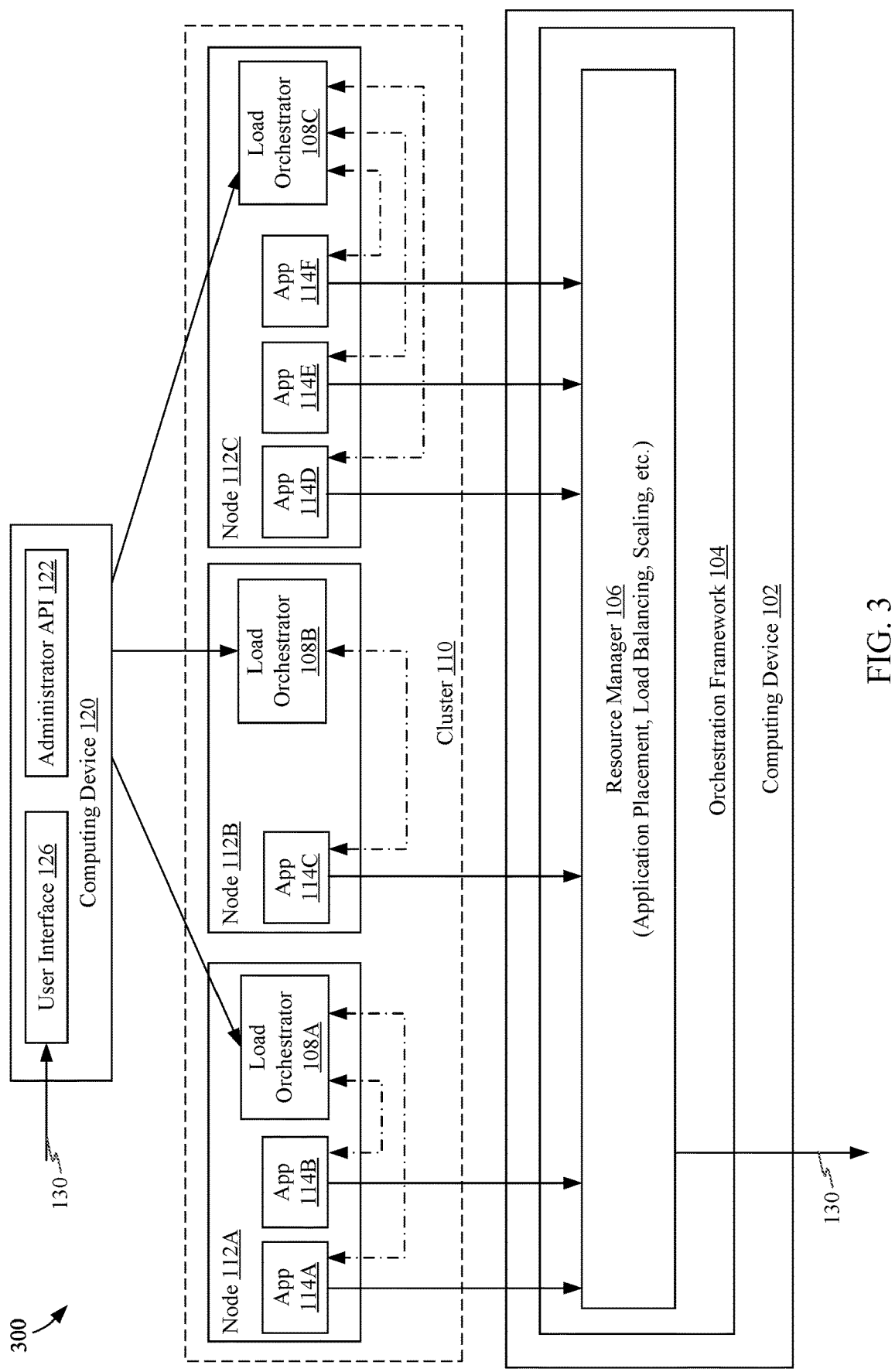
FIG. 3 is a block diagram of a system that includes a plurality of load orchestrators that are configured for testing resource management behavior of an orchestration framework, where each of the load orchestrators is instantiated in a node of a cluster of nodes, according to an example embodiment.

As shown in FIG. 3, system 300 includes various elements previously described with respect to system 100. However, the architecture of system 300 differs from the architecture of system 100 in that rather than load orchestrator 108 being a component of orchestration manager 104 of computing device 102, as shown in system 100, in system 300, load orchestrator 108 is instantiated in node 112A as load orchestrator 108A, in node 112B as load orchestrator 108B, and in node 112C as load orchestrator 108C.

In system 300, load orchestrators 108A-108C are configured to control a process for testing the behavior of resource manager 106 under various artificial workloads in nodes 112A-112C of cluster 110. More specifically, for testing purposes, load orchestrator 108A is configured to orchestrate reporting of artificial metric 124 values by applications 114A-114B to resource manager 106, load orchestrator 108B is configured to orchestrate reporting of artificial metric 124 values by application 114C to resource manager 106, and load orchestrator 108C is configured to orchestrate reporting of artificial metric 124 values by applications 114D-114F to resource manager 106. As described with respect to FIGS. 1 and 2, the value of artificial metric 124 values may be based on a utilization model, which may represent an actual workload measured and/or reported in a live production cluster. The one or more applications 114A-114F then report artificial metric 124 values to resource manager 106 as described with respect to FIGS. 1 and 2.

Administrator API 122 of computing device 120 is configured to transmit information to each of load orchestrators 108A-108C by which they can obtain artificial metric 124 (as described in more detail with respect to FIG. 5). As described above, the information may include one or more artificial metric 124 values. Alternatively or in addition, the information may include logic, code, and/or parameters for sampling values of a utilization model and generating one or more artificial metric 124 values based on the model.

Load orchestrators 108A-108C may be configured to obtain artificial metric 124 values from computing device 120, as a result of a user initiated call to administrator API 122. As described above, artificial metric 124 may represent any suitable metric such as a physical metric, a logical metric, etc. For example, artificial metric 124 may represent a workload metric (e.g., CPU usage, memory allocation, disk usage, number of webserver sessions, number of video streaming sessions, etc.) for use by resource manager 106 to manage workload in cluster 110. Alternatively or in addition, load orchestrators 108A-108C may be configured receive executable logic, code, and/or parameters of a utilization model from computing device 120 as a result of the API call. As described above, load orchestrators 108A-108C may also be configured to execute the logic, code, and/or parameters to generate samples of the utilization model, which may be used to determine the one or more artificial metric 124 values. Load orchestrators 108A-108C may be configured to store the received executable logic, code, and/or parameters of a utilization model and/or one or more artificial metric 124 values in a persistent storage (not shown) such that they may be utilized even after a rebooting of computing device 102 for future testing purposes.

In some embodiments, load orchestrator 108A is configured to receive a request for an artificial metric 124 (e.g., an artificial CPU usage metric, an artificial memory allocation metric, an artificial disk usage metric, an artificial number of webserver sessions metric, an artificial number of video streaming sessions, etc.) from one or more of applications 114A-114B. Load orchestrator 108B is configured to receive a request for an artificial metric 124 from application 114C. Load orchestrator 108C is configured to receive a request for an artificial metric 124 from one or more of applications 114D-114F. In response to the requests, each of load orchestrators 108A-108C are configured to transmit artificial metric 124 values to their respective applications. In some embodiments, load orchestrators 108A-108C may each obtain different artificial metrics 124 (e.g., independent of the other load orchestrators).

In embodiments, systems 100 and 300 may operate in various ways to perform their functions. For example, FIG. 4 is a flowchart 400 of a method for testing resource management behavior of an orchestration framework by one or more load orchestrators, according to an example embodiment.

In one embodiment, flowchart 400 may be performed by load orchestrator 108 of FIG. 1. In another embodiment, flowchart 400 may be performed by load orchestrators 108A-108C of FIG. 3. For the purposes of illustration, flowchart 400 of FIG. 4 is described with reference to FIGS. 1 and 3.

Figure 4:
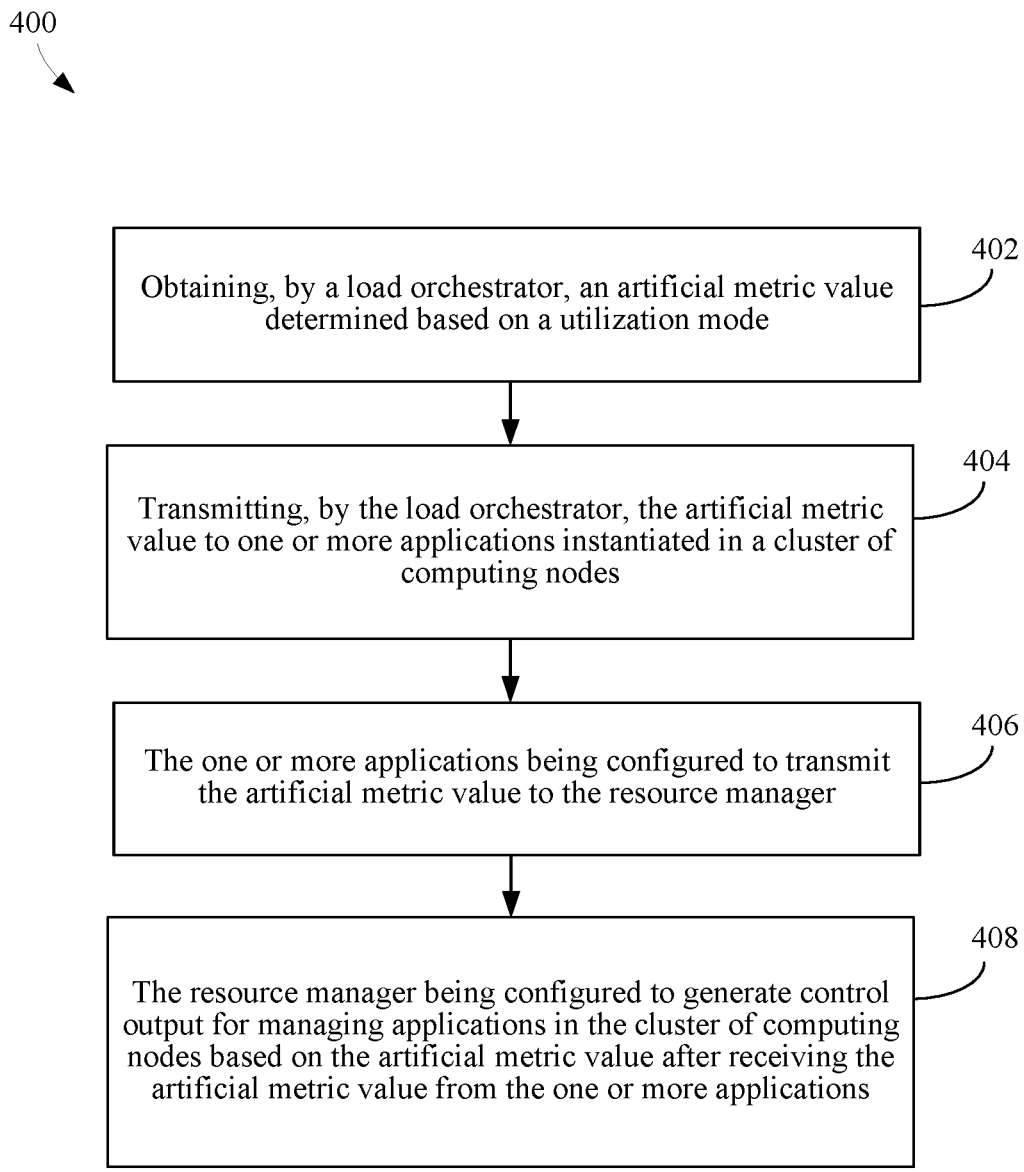
FIG. 4 is a flowchart 400 of a method for testing resource management behavior of an orchestration framework by one or more load orchestrators, according to an example embodiment.

Flowchart 400 of FIG. 4 begins with step 402. In step 402, a load orchestrator obtains an artificial metric value determined based on a utilization model of resource usage over time. With reference to FIG. 1, and as described above with respect to FIG. 2, load orchestrator 108 of orchestration framework 104 may obtain an artificial metric 124 value. The value of artificial metric 124 may be determined based on a utilization model of resource usage over time. Load orchestrator 108 may receive an artificial metric 124 value or the utilization model from computing device 120 as a result of a user initiated call to API 122 of computing device 120.

Alternatively, with reference to FIG. 3, one or more of load orchestrators 108A-108C of nodes 112A-112C respectively, may obtain the artificial metric 124 value. As described above, the artificial metric 124 value may be determined based on a utilization model of resource usage over time. The one or more of load orchestrators 108A-108C may receive the artificial metric 124 value, and/or the utilization model from computing device 120 as a result of a user initiated call to API 122.

For example, information received from computing device 120 may include one or more artificial metric 124 values. Artificial metric 124 may represent any suitable metric such as a physical metric, a logical metric, etc. For example, artificial metric 124 may represent a workload metric (e.g., CPU usage, memory allocation, disk usage, number of webserver sessions, etc.) for use by resource manager 106 to manage workload in cluster 110. Alternatively, or in addition, the information from computing device 120 may include logic, code, and/or parameters for sampling a utilization model and generating one or more artificial metric 124 values. For example, the received information may describe a model, such as a model of CPU usage over time (e.g., a normal distribution, exponential growth, etc.). The received information may include parameters of the model (e.g., mean, variance, etc.) and may indicate points in time to sample the distribution. Load orchestrator 108 of orchestration framework 104, and of the one or more of load orchestrators 108A-108C of respective nodes 112A-112C, may execute the code to sample the CPU usage model and generate the one or more artificial metric 124 values. The received information and/or one or more artificial metric 124 values may be stored in persistent storage (not shown) such that they may be utilized even after a system reboot.

In step 404, the load orchestrator transmits the artificial metric value to one or more applications instantiated in a cluster of computing nodes. For example, with reference to FIG. 1, and as described with respect to flowchart 200, load orchestrator 108 of orchestration framework 104 may transmit one or more artificial metric 124 values to one or more of applications 114A-114F in nodes 112A-112C of cluster 110.

Alternatively, or in addition, with reference to FIG. 3, load orchestrators 108A-108C that are instantiated in nodes 112A-112C respectively, may each transmit one or more artificial metric 124 values to one or more applications, of applications 114A-114F, which are instantiated within their respective node of nodes 112A-112C. In other words, load orchestrator 108A may transmit one or more artificial metric 124 values to applications 114A and 114B, load orchestrator 108B may transmit one or more artificial metric 124 values to application 114C, and load orchestrator 108C may transmit one or more artificial metric 124 values to applications 114D-114F.

User input received via user interface 126 may specify sending artificial metric 124 to particular applications 114A-114F, of nodes 112A-112C, and/or one or more particular clusters, such as cluster 110. Furthermore, an application may request an artificial metric from a load orchestrator. For example, application 114A may transmit a request signal to load orchestrator 108A, within its node 112A, to request an artificial metric 124. In response, load orchestrator 108A may transmit artificial metric 124 to application 114A. Alternatively, or in a addition, in response to the request, load orchestrator 108A may execute a utilization model to sample a distribution, generate an artificial metric 124 value based on the sample, and transmit the artificial metric 124 value to application 114A and/or 114B for the reporting artificial metric 124 value to resource manager 106.

In step 406, the one or more applications are configured to transmit the artificial metric value to the resource manager. For example, one or more of applications 114A-114F that received an artificial metric 124 value from load orchestrator 108 may be configured to transmit artificial metric 124 values to resource manager 106.

In step 408, the resource manager may be configured to generate control output for managing applications in the cluster of computing nodes, based on the artificial metric value, after receiving the artificial metric value from the one or more applications. For example, as described above with respect to flowchart 200, resource manager 106 may generate control output 130 for managing applications in computing nodes 112A-112C of cluster 110 based on the received artificial metric 124 value. Control output 130 may indicate, for example, at least one of the following operations of resource manager 106 with respect to applications in cluster 110 of computing nodes 112A-112C under conditions represented by the resource usage model: scaling, load balancing, application placement, failover of applications, defragmenting data, etc.

Embodiments of a system for testing operations performed by resource manager 106 may be implemented in various ways. For instance, FIG. 5 is a is a block diagram of a system for generating an artificial metric, according to an example embodiment. As shown in FIG. 5, system 500 includes resource manager 106, administrator API 122, a load orchestrator 508, applications 514A-514F, and control output 130. Load orchestrator 508 includes utilization model 550, artificial metric generator 552, and artificial metric 124.

Load orchestrator 508 may be communicatively coupled to administrator API 122 and one or more applications, such as applications 514A-514F. Load orchestrator 508 may be similar or substantially the same as any of load orchestrators 108, 108A, 108B, and 108C described with respect to FIGS. 1 and 3. For example, load orchestrator 508 may be instantiated in an orchestration framework, such as orchestration framework 104 of computing device 102. Applications 514A-514F may be remotely located from load orchestrator 508 and may be instantiated in one or more nodes (e.g., nodes 112A-112C) of one or more clusters (e.g., cluster 110). Load orchestrator 508 may be configured to communicate with remote applications 514A-514F to send artificial metric 124 to the applications. In another example, applications 514A-514F may be instantiated within a single node (e.g., node 112A of cluster 110). Load orchestrator 508 may be instantiated within the same node (e.g., nodes 112A of cluster 110) as applications 514A-514F, and may be configured to communicate locally with applications 514A-514F to send artificial metric 124 values to the applications. Functions described with respect to system 500 may apply to either of systems 100 or 300. As described above, applications 514A-514F may include any suitable applications instantiated in one or more nodes of a cluster, such as SQL database applications, website servers, real time stream processing engines, a web-based document management system, a storage system, or other types of applications.

As described above, artificial metric 124 may represent a workload metric (e.g., CPU usage, memory allocation, disk usage, number of webserver sessions, number of video streaming sessions, etc.) or may be any suitable artificial metric that is defined for use by resource manager 106 to determine how to manage workload in a cluster including applications 514A-514F. Load orchestrator 508 is configured to obtain artificial metric 124 values. For example, utilization model 550 be transmitted to load orchestrator 508 as a result of a user initiated call to administrator API 122. In this regard, administrator API 122 may be called via user interface 126 (e.g., a graphical user interface, a command shell interface, etc.). In some embodiments, artificial metric 124 values may be programmatically generated or predefined by a user (e.g., via user interface 126 in computing device 120) and sent to load orchestrator 508. Alternatively, or in addition, artificial metric generator 552 may be configured to generate the artificial metric 124 values based on utilization model 550.

In some embodiments, the utilization model 550 may comprise values distributed over time or it may be stateless (e.g., including probabilities of the occurrence of an event). Utilization model 550 may represent various application usage patterns. In some embodiments, an application usage pattern may comprise a statistical distribution of resource usage over time. Moreover, in some embodiments, the usage patterns may be based on production data that represents the kinds of workloads reported by applications running in production clusters (e.g., applications running in clusters deployed in the field). In general, utilization models (e.g., utilization model 550) may exhibit usage patterns such as steady, bursty, temporal burstiness, monotonically increasing, normal, idle, exponentially increasing, etc. With these types of usage models, developers are able to mix and match various application workloads, as artificial metrics, to understand how resource manager 106 operates under different usage scenarios. The method used for generating artificial metric 124 values may vary depending on a type of distribution used to model a workload.

In some embodiments, utilization model 550 may be defined by executable code and/or parameters for generating artificial metric 124 values for an application (e.g., one or more of applications 514A-514F). For example, utilization model 550 may be described based on a language (e.g., XML, JSON, etc.) that allows an arbitrary description of utilization model 550. In some embodiments, utilization model 550 may be transmitted to load orchestrator 508 in a command that is generated based on a call to administrator API 122. The command may include a definition of utilization model 550 for generating artificial metric 124 values. The command may also include parameters indicating which applications (e.g., all of applications 514A-514F, the applications of node 3, etc.) should receive artificial metric 124 for reporting the metric to resource manager 106. FIG. 5 shows an example of artificial CPU metrics being transmitted to applications 514A-514F and reported by applications 514A-514F to resource manager 106. In this example, applications 514A-514C receive and report an artificial CPU utilization metric value of 0%, application 514D receives and reports an artificial metric value of 33%, and applications 514E-514F receive and report an artificial metric value of 30%.

Artificial metric generator 552 may be configured to execute the code and/or parameters of utilization model 550 to generate one or more values of artificial metric 124. In one example, utilization model 550 may include code and parameters that are configured to generate a normal distribution that represents database memory consumption. Distribution parameters of utilization model 550 may define aspects of the distribution (e.g., mean and variance parameters of the normal distribution). Utilization model 550 may also include code and/or temporal parameters that indicate when to sample utilization model 550 for generation of artificial metric 124 values, or when one or more of applications 514A-514F are to report artificial metric 124 values to resource manager 106. Accordingly, artificial metric generator 552 may sample the distribution of utilization model 550, generate artificial metric 124 values, and send artificial metric 124 values to the appropriate applications of applications 514A-514F. The appropriate applications of applications 514A-514F may then send the received artificial metric 124 values to resource manager 106. As described above, resource manager 106 may receive artificial metric 124 values and generate control output 130 based on artificial metric 124 values.

In one embodiment, utilization model 550 may indicate a usage pattern for reporting artificial metric 124 values to resource manager 106, where the pattern includes a normal distribution followed by an idle state, followed by another normal distribution. In this example, the temporal parameters of utilization model 550 may indicate that values of the first normal distribution should be sampled and reported every minute for twenty minutes, followed by a constant value being sampled and reported every minute for sixty minutes, followed by another twenty minutes of sampling and reporting the normal distribution every minute. In another embodiment, utilization model 550 may be stateless. For example, utilization model 550 may comprise a set of probabilities relating to events (e.g., 50% chance X is reported, 50% chance y is reported).

As described above, load orchestrator 508 may be configured to store the received utilization model 550 and/or one or more artificial metric 124 values in a persistent storage such that they may be utilized even after a rebooting of computing device 102 or a node hosting load orchestrator 508. In some embodiments, load orchestrator 508 may receive a command generated by a call to an administrator API 122 that specifies that load orchestrator 508 is to sample a stored distribution of utilization model 550 based on a specified periodicity, or to use a default period to sample the distribution (e.g., an internal clock period). Load orchestrator 508 may sample the distribution and send corresponding artificial metric 124 values to one or more of applications 514A-514F. The applications may report the artificial metric 124 values to resource manager 106 according to the specifications of the command. In another command, a different period may be indicated for sampling the distribution. For example, the sampling period may be doubled or halved. In another embodiment, utilization model 550 may comprise a series of time stamped artificial metric 124 values that may be sent to one or more of applications 514A-514F according to the time stamps, and reported to resource manager 106 by the one or more applications.

Figure 6:
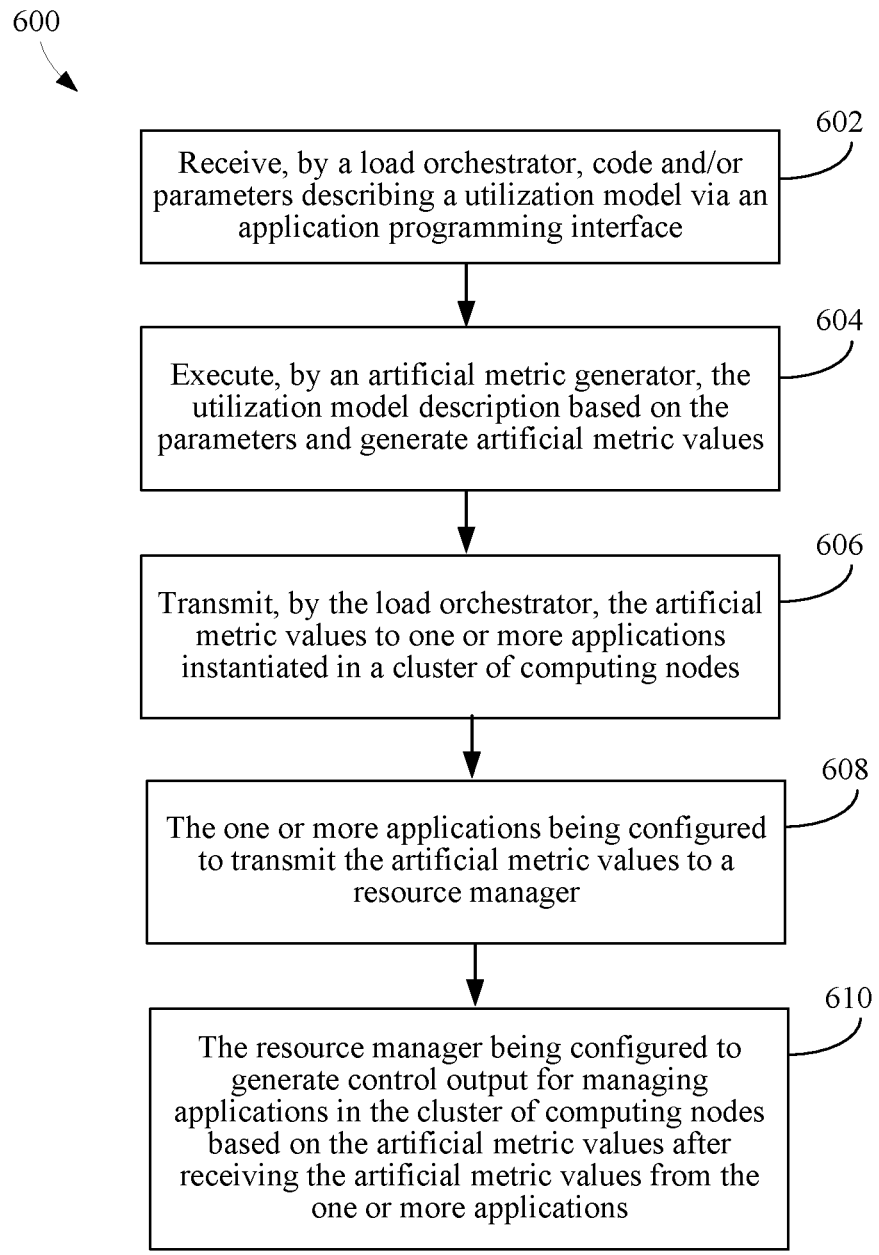
FIG. 6 is a flowchart of a method for generating an artificial metric, according to an example embodiment.

In embodiments, system 500 may operate in various ways to perform its functions. For example, FIG. 6 is a flowchart providing a method for generating an artificial metric, according to an example embodiment. In one embodiment, flowchart 600 may be performed by load orchestrator 508. For the purposes of illustration, flowchart 600 of FIG. 6 is described with reference to FIG. 5.

Flowchart 600 of FIG. 6 begins with step 602. In step 602, a load orchestrator receives code and/or parameters describing a utilization model via an application programming interface. For example, load orchestrator 508 may receive utilization model 550. Utilization model 550 may be defined by executable code and/or parameters for generating a pattern of resource usage over time for an application (e.g., one or more of applications 514A-514F). In another example, utilization model 550 may be stateless and defined by executable code and/or parameters that generate a set of outcomes. In some embodiments, utilization model 550 may be transmitted to load orchestrator 508 within a command that is generated based on a call to administrator API 122. The command may include a definition of utilization model 550 for generating artificial metric 124 values, and/or parameters indicating which applications (e.g., of applications 514A-514F) should receive artificial metric 124 values for reporting them to resource manager 106. In some embodiments, utilization model 550 includes parameters that define aspects of a statistical distribution defined by the model. Utilization model 550 may also include code and/or parameters that indicate how often or when to sample utilization model 550, or how often or when one or more of applications 514A-514F are to report artificial metric 124 values to resource manager 106.

In step 604, an artificial metric generator may execute the utilization model description based on the parameters and generate artificial metric values. For example, artificial metric generator 552 may execute resource utilization model 550 and generate one or more artificial metric 124 values. The artificial metric 124 values may represent any arbitrary real or meta metric, for example, a state, a behavior, a relevant input, or a usage or performance metric defined for applications 514A-514F (e.g., CPU usage, memory allocation, or disk usage, number of webserver sessions, number of video streaming sessions, etc.).

In step 606, the load orchestrator may transmit the artificial metric values to one or more applications instantiated in a cluster of computing nodes. For example, load orchestrator 508 may transmit artificial metric 124 values to one or more of applications 514A-514F. In some embodiments, a parameters of command generated by a call to administrator API 122 may include parameters that indicate which of applications 514A-514F are to receive artificial metric 124 values for reporting the artificial metric values to resource manager 106.

In step 608, the one or more applications are configured to transmit the artificial metric value to a resource manager. For example, one or more of applications 514A-514F are configured to transmit artificial metric 124 values to resource manager 106. In some embodiments, artificial metric 124 values may be reported to resource manager 106 at a time or interval indicated by parameters of utilization model 550.

In step 610, the resource manager is configured to generate control output for managing applications in the cluster of computing nodes based on the artificial metric values in response to receiving the artificial metric values from the one or more applications. For example, in response to receiving artificial metric 124 values from one or more of applications 514A-514F, resource manager 106 is configured to generate control output 130 for managing applications of computing nodes 112A-112C in cluster 110 based on artificial metric 124 values. For example, control output 130 may indicate one or more of scaling, load balancing, application placement, failover of applications, or defragmenting data in one or more of nodes 112A-112C of cluster 110 or other clusters.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 of FIG. 1, system 300 of FIG. 3, and system 500 of FIG. 5, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 7:
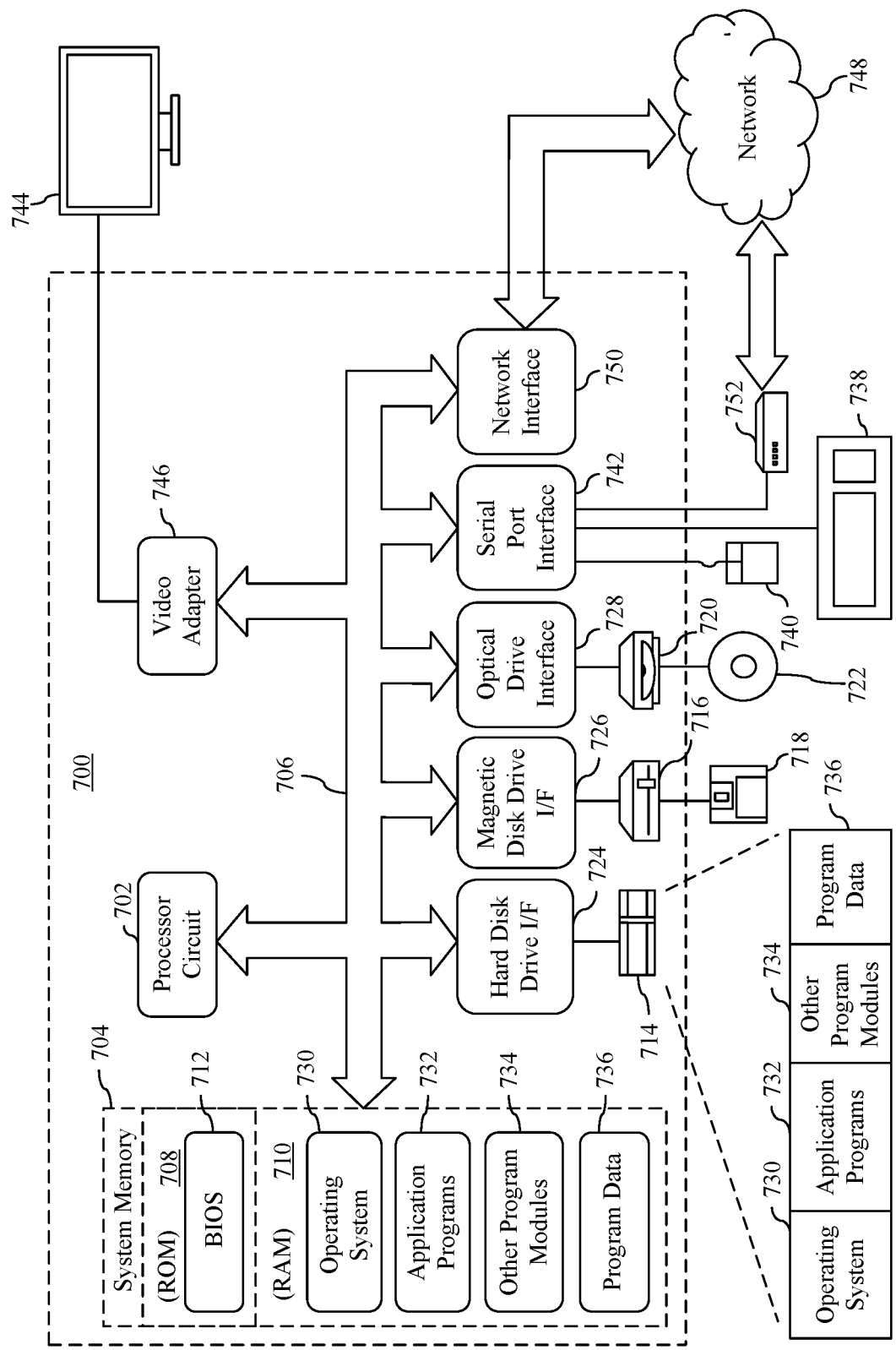
FIG. 7 is a block diagram of an example processor-based computer system that may be used to implement various embodiments.

FIG. 7 is a block diagram of an example processor-based computer system 700 that may be used to implement various embodiments. Computing device 102, nodes 112A-112C, and computing device 120 may each include any type of computing device, mobile or stationary, such as a desktop computer, a server, a video game console, etc. For example, any of computing device 102, nodes 112-112C, and computing device 120 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

Computing device 102, nodes 112A-112C, and computing device 120 may each be implemented in one or more computing devices containing features similar to those of computing device 700 in stationary or mobile computer embodiments and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing computing device 102, nodes 112A-112C, computing device 120, orchestration framework 104, resource manager 106, load orchestrator 108, applications 114A-114F, administrator API 122, user interface 126, artificial metric 124, utilization model 550, artificial metric generator 552, applications 514A-514F, flowchart 200, flowchart 400, flowchart 600, and/or further embodiments described herein. Program data 736 may include artificial metric 124, control output 130, utilization model 550, and/or further embodiments described herein.

A user may enter commands and information into computing device 600 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a testing system for testing a resource manager of an application management system is described herein. The testing system comprises one or more processors and one or more memory devices that store program code to be executed by the one or more processors. The program code comprises an orchestration framework. The orchestration framework comprises a load orchestrator. The load orchestrator is configured to obtain an artificial metric value determined based on a utilization model, and transmit the artificial metric value to one or more applications instantiated in a cluster of computing nodes. The resource manager is configured to receive the artificial metric value from the one or more applications, and generate control output for managing applications in the cluster of computing nodes based on the received artificial metric value.

In an embodiment of the foregoing testing system, the control output from the resource manager indicates at least one of the following operations of the resource manager with respect to applications in the cluster of computing nodes under conditions represented by the utilization model: scaling; load balancing; application placement; failover of applications; or defragmenting data.

In an embodiment of the foregoing testing system, the load orchestrator is configured to obtain the artificial metric value by receiving the utilization model via an application programming interface; and generating the artificial metric value based on the utilization model.

In an embodiment of the foregoing testing system, the load orchestrator is configured to transmit the artificial metric value to the one or more applications responsive to receiving a request for the artificial metric value from the one or more applications.

In an embodiment of the foregoing testing system, the utilization model is an executable model indicating a distribution of values over time.

In an embodiment of the foregoing testing system, the utilization model is based on measured metrics of one or more applications running in a production system.

In an embodiment of the foregoing testing system, the artificial metric value represents CPU usage, memory allocation, or disk usage, number of webserver sessions, or number video streaming sessions.

In an embodiment, a testing system for testing a resource manager of an application management system comprises one or more processors; and one or more memory devices that store program code to be executed by the one or more processors. The program code comprises a load orchestrator communicatively coupled to one or more applications instantiated in one or more computing nodes of a cluster of computing nodes. The load orchestrator is configured to: obtain an artificial metric value determined based on a utilization model; and transmit the artificial metric value to one or more of the applications. The one or more applications being configured to transmit the artificial metric value to the resource manager. The resource manager being configured to generate control output for managing the one or more applications in the cluster of computing nodes based on the artificial metric value after receiving the artificial metric value from the one or more applications.

In an embodiment of the foregoing testing system, the load orchestrator is instantiated in one of: an orchestration framework comprising the resource manager; or one or more of the computing nodes of the cluster of computing nodes.

In an embodiment of the foregoing testing system, the load orchestrator is configured to transmit the artificial metric value to the one or more applications responsive to receiving a request for the artificial metric value from the one or more applications.

In an embodiment of the foregoing testing system, the utilization model is an executable model indicating a distribution of values over time.

In an embodiment of the foregoing testing system, the utilization model is based on measured metrics of one or more applications running in a production system.

In an embodiment of the foregoing testing system, the artificial metric value represents CPU usage, memory allocation, or disk usage.

In an embodiment, a testing method for testing a resource manager of an application management system comprises: obtaining, by a load orchestrator, an artificial metric value determined based on a utilization model; and transmitting, by the load orchestrator, the artificial metric value to one or more applications instantiated in a cluster of computing nodes. The one or more applications being configured to transmit the artificial metric value to the resource manager. The resource manager being configured to generate control output for managing applications in the cluster of computing nodes based on the artificial metric value after receiving the artificial metric value from the one or more applications.

In an embodiment of the foregoing testing method, the load orchestrator is instantiated in one of: an orchestration framework comprising the resource manager; and one or more of the computing nodes of the cluster of computing nodes.

In an embodiment of the foregoing testing method, the load orchestrator is configured to transmit the artificial metric value to the one or more applications responsive to receiving a request for the artificial metric value from the one or more applications.

In an embodiment of the foregoing testing method, the utilization model is an executable model indicating a distribution of values over time.

In an embodiment of the foregoing testing method, the utilization model is based on measured metrics of one or more applications running in a production system.

In an embodiment of the foregoing testing method, the artificial metric value represents CPU usage, memory allocation, or disk usage, number of webserver sessions, or number video streaming sessions.

In an embodiment of the foregoing testing method, the control output from the resource manager indicates at least one of the following operations of the resource manager with respect to applications in the cluster of computing nodes under conditions represented by the utilization model: scaling; load balancing; application placement; failover of applications; or defragmenting data.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A computing device comprising:
a processor circuit; and
a memory device that stores program code structured to cause the processor to:
receive an input in a user interface, the input comprising a call to an application programming interface (API);
transmit, using the API and to a load orchestrator, information that causes the load orchestrator to obtain an artificial metric value based on the information and transmit the artificial metric value to a first application instantiated in a cluster of computing nodes, the artificial metric value representative of a value of a metric reportable to a resource manager by the first application, the resource manager to receive the artificial metric value from the first application and configured to generate a control output for managing the first application based on the artificial metric value;
receive, from the resource manager, the control output for managing the first application; and
responsive to said receive the control output, display the control output in the user interface.

2. The computing device of claim 1, wherein:
the received input comprises a selection of the artificial metric value; and
to transmit the information to the load orchestrator, the program code is further structured to cause the processor to:
transmit the artificial metric value to the load orchestrator.

3. The computing device of claim 2, wherein:
the received input indicates a sampling rate; and
to transmit the information to the load orchestrator, the program code is further structured to cause the processor to:
transmit the sampling rate to the load orchestrator that causes the load orchestrator to transmit the artificial metric value based on the sampling rate.

4. The computing device of claim 1, wherein:
the received input comprises a selection of a utilization model; and
to transmit the information to the load orchestrator, the program code is further structured to cause the processor to:
transmit logic, code, or a parameter to the load orchestrator that causes the load orchestrator to:
generate values of a utilization model, and
determine the artificial metric value based on the utilization model.

5. The computing device of claim 4, wherein:
the received input indicates a sampling rate; and
to transmit the information to the load orchestrator, the program code is further structured to cause the processor to:
transmit the logic, the code, or the parameter to the load orchestrator that causes the load orchestrator to, based on the sampling rate:
sample the utilization model;
determine the artificial metric value based on the sampled utilization model; and
transmit the artificial metric value to the first application.

6. The computing device of claim 4, wherein the utility model comprises a series of time stamped artificial metric values comprising the artificial metric value.

7. The computing device of claim 1, wherein the control output indicates how the resource manager would function utilizing a new placement algorithm in comparison to a previous placement algorithm.

8. A computer-implemented method comprising:
receiving an input in a user interface, the input comprising a call to an application programming interface (API);
transmitting, using the API and to a load orchestrator, information that causes the load orchestrator to obtain an artificial metric value based on the information and transmit the artificial metric value to a first application instantiated in a cluster of computing nodes, the artificial metric value representative of a value of a metric reportable to a resource manager by the first application, the resource manager to receive the artificial metric value from the first application and configured to generate a control output for managing the first application based on the artificial metric value;
receiving, from the resource manager, the control output for managing the first application; and
responsive to receiving the control output, displaying the control output in the user interface.

9. The method of claim 8, wherein:
the received input comprises a selection of the artificial metric value; and
said transmitting the information to the load orchestrator comprises transmitting the artificial metric value to the load orchestrator.

10. The method of claim 9, wherein:
the received input indicates a sampling rate; and
said transmitting the information to the load orchestrator comprises:
transmitting the sampling rate to the load orchestrator that causes the load orchestrator to transmit the artificial metric value based on the sampling rate.

11. The method of claim 8, wherein:
the received input comprises a selection of a utilization model; and
said transmitting the information to the load orchestrator comprises:
transmitting logic, code, or a parameter to the load orchestrator that causes the load orchestrator to:
generate values of a utilization model, and
determine the artificial metric value based on the utilization model.

12. The method of claim 11, wherein:
the received input indicates a sampling rate; and
said transmitting the information to the load orchestrator comprises:
transmitting the logic, the code, or the parameter to the load orchestrator that causes the load orchestrator to, based on the sampling rate:
sample the utilization model;
determine the artificial metric value based on the sampled utilization model; and
transmit the artificial metric value to the first application.

13. The method of claim 11, wherein the utility model comprises a series of time stamped artificial metric values comprising the artificial metric value.

14. The method of claim 8, wherein the control output indicates how the resource manager would function utilizing a new placement algorithm in comparison to a previous placement algorithm.

15. A computer-readable storage medium encoded with program instructions that, when executed by a processor circuit, performs a method comprising:
   receiving an input in a user interface, the input comprising a call to an application programming interface (API);
   transmitting, using the API and to a load orchestrator, information that causes the load orchestrator to obtain an artificial metric value based on the information and transmit the artificial metric value to a first application instantiated in a cluster of computing nodes, the artificial metric value representative of a value of a metric reportable to a resource manager by the first application, the resource manager to receive the artificial metric value from the first application and configured to generate a control output for managing the first application based on the artificial metric value;
   receiving, from the resource manager, the control output for managing the first application; and
   responsive to receiving the control output, displaying the control output in the user interface.

16. The computer-readable storage medium of claim 15, wherein:
   the received input comprises a selection of the artificial metric value; and
   said transmitting the information to the load orchestrator comprises transmitting the artificial metric value to the load orchestrator.

17. The computer-readable storage medium of claim 16, wherein:
   the received input indicates a sampling rate; and
   said transmitting the information to the load orchestrator comprises:
      transmitting the sampling rate to the load orchestrator that causes the load orchestrator to transmit the artificial metric value based on the sampling rate.

18. The computer-readable storage medium of claim 15, wherein:
   the received input comprises a selection of a utilization model; and
   said transmitting the information to the load orchestrator comprises:
      transmitting logic, code, or a parameter to the load orchestrator that causes the load orchestrator to:
      generate values of a utilization model, and
      determine the artificial metric value based on the utilization model.

19. The computer-readable storage medium of claim 18, wherein:
   the received input indicates a sampling rate; and
   said transmitting the information to the load orchestrator comprises:
      transmitting the logic, the code, or the parameter to the load orchestrator that causes the load orchestrator to, based on the sampling rate:
      sample the utilization model;
      determine the artificial metric value based on the sampled utilization model; and
      transmit the artificial metric value to the first application.

20. The computer-readable storage medium of claim 15, wherein the control output indicates how the resource manager would function utilizing a new placement algorithm in comparison to a previous placement algorithm.

\* \* \* \* \*